(12) United States Patent
Meyers et al.

(10) Patent No.: US 7,486,221 B2
(45) Date of Patent: Feb. 3, 2009

(54) METHODS AND SYSTEMS FOR USING PULSED RADAR FOR COMMUNICATIONS TRANSPARENT TO RADAR FUNCTION

(75) Inventors: David W. Meyers, Brooklyn Park, MN (US); James A. Freebersyser, Chanhassen, MN (US); Harold Vincent Poor, Princeton, NJ (US); Srivatsan Varadarajan, Minneapolis, MN (US)

(73) Assignee: Honeywell International Inc., Morristown, NJ (US)

( * ) Notice: Subject to any disclaimer, the term of this patent is extended or adjusted under 35 U.S.C. 154(b) by 99 days.

(21) Appl. No.: 11/552,372

(22) Filed: Oct. 24, 2006

(65) Prior Publication Data

US 2007/0139253 A1    Jun. 21, 2007

Related U.S. Application Data

(60) Provisional application No. 60/737,928, filed on Nov. 18, 2005.

(51) Int. Cl.
*G01S 13/00* (2006.01)
*H04J 7/00* (2006.01)

(52) U.S. Cl. .................. 342/60; 342/82; 342/88; 370/213

(58) Field of Classification Search ............ 342/13–19, 342/60, 73, 82–88, 120, 137, 159–164, 175, 342/195, 200–204; 370/213, 280, 314, 321, 370/336, 337
See application file for complete search history.

(56) References Cited

U.S. PATENT DOCUMENTS

| 4,764,769 | A | * | 8/1988 | Hayworth et al. | ............. 342/50 |
| 5,583,505 | A |  | 12/1996 | Andersen et al. | |
| 5,719,582 | A |  | 2/1998 | Gray | |
| 5,966,091 | A | * | 10/1999 | Andersson | .................. 342/60 |
| 6,407,697 | B1 | * | 6/2002 | Hager et al. | ................ 342/120 |
| 6,671,310 | B1 |  | 12/2003 | Richards et al. | |
| 6,778,603 | B1 |  | 8/2004 | Fullerton et al. | |
| 6,847,675 | B2 | * | 1/2005 | Fullerton et al. | ............ 375/130 |
| 6,937,639 | B2 |  | 8/2005 | Pendergrass et al. | |
| 7,034,738 | B1 |  | 4/2006 | Wang et al. | |
| 7,082,172 | B1 |  | 7/2006 | Pringle et al. | |
| 2003/0043934 | A1 |  | 3/2003 | Roberts | |

* cited by examiner

*Primary Examiner*—Thomas H Tarcza
*Assistant Examiner*—Peter M Bythrow
(74) *Attorney, Agent, or Firm*—Fogg & Powers LLC

(57) ABSTRACT

A method and system are disclosed where transmitted radar pulses are utilized for both a radar sensing function and for data communications. The data communications are performed in a manner that is simultaneous and transparent to the radar sensing function, in terms of non interference or interruption. The method and system are applicable to data communications between multiple pulsed radar devices as well as radar devices that are capable of receiving pulsed transmissions and transmitting continuous wave transmissions.

11 Claims, 3 Drawing Sheets

"Baseline" Transmitted Radar Pulse

METHODS AND SYSTEMS FOR USING PULSED RADAR FOR COMMUNICATIONS TRANSPARENT TO RADAR FUNCTION

CROSS REFERENCE TO RELATED APPLICATIONS

This application claims the benefit of U.S. provisional application No. 60/737,928 filed Nov. 18, 2005, which is herein incorporated by reference in its entirety.

BACKGROUND OF THE INVENTION

This invention relates generally to the operation of pulsed radars, and more specifically, to methods and systems for using pulsed radars for communications simultaneously, and accomplished with a potentially tolerable level of coexistence with the radar function.

Pulsed radars are traditionally used for a variety of range and direction sensing applications including target detection and tracking, surveillance, weather monitoring, actuator positioning, and other applications. In known applications where pulsed radars are utilized, radar functions and communications functions are performed by separate transmitting and receiving devices. Though both radars and communications equipment both incorporate transmitting and receiving devices, they are typically operated in separate frequency bands, each including separate antenna systems.

A pulsed radar typically has a small transmit duty cycle. In certain applications, the duty cycle of the pulsed radar is small so that the radar function is mostly off and the transmitter is idle, thereby, allowing potential use for other communications functions during this idle time. The off-state of the radar function produces a window of opportunity for the radar to be now used for a different function, namely the function of communications. The communication window can be accomplished with a potentially tolerable level of co-existence with the radar function. The two systems utilize the same equipment but operate in separate divisions ( i.e. time, frequency and/or code.)

BRIEF DESCRIPTION OF THE INVENTION

In one aspect, a method for transmitting data utilizing transmitted radar pulses is provided. The method includes determining a pulse repetition interval for radar transmissions, providing a first radar pulse for utilization as a reference pulse, and providing a second radar pulse based on the pulse repetition interval, a position of the second radar pulse with respect to the pulse repetition interval and the first radar pulse indicative of data to be provided to an intended receiver.

In another aspect, a radar altimeter is provided that includes a transmitter and a radar processor. The radar processor is configured to receive data from a controller, and further configured to cause the transmitter to transmit radar pulses at a pulse repetition interval where a position of a second radar pulse with respect to the pulse repetition interval and a first radar pulse is determined based on the data received from the controller.

DETAILED DESCRIPTION OF THE INVENTION

Described herein are methods and systems for utilizing pulsed radars to provide data communications to and from other pulsed radars and between a pulsed radar and a continuous wave device. Also described are multi-user detection techniques which provide for separate simultaneous, co-channel signals from other signals. Examples of these other signal sources include, but are not limited to, radio and radar signals.

Pulsed radars are traditionally used for a range of sensing applications including target detection and tracking, surveillance, weather monitoring, actuator positioning, etc. Described below are systems and methods by which the transmitted radar pulse is used simultaneously for both the radar sensing function and for data communications in a manner that is transparent to the radar sensing function, in terms of non interference or interruption. The systems and methods are applicable to data communications between separate pulsed radar devices as well as to devices capable of receiving pulsed transmissions and continuous wave transmission. Such devices may be airborne, ground-based, or a combination thereof.

Figure 1:
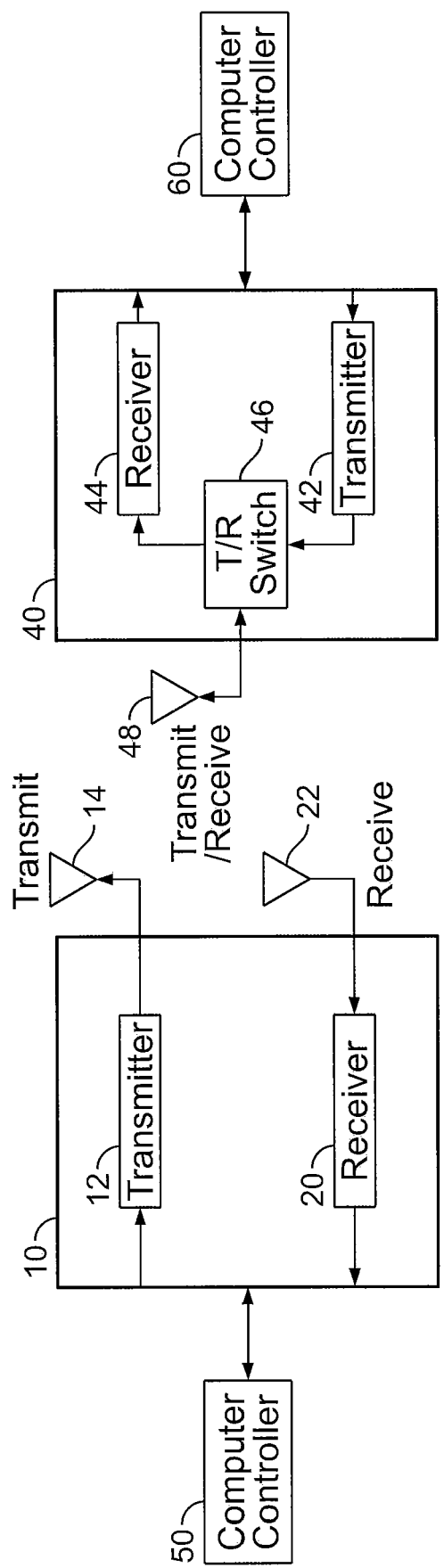
FIG. 1 is a system block diagram showing signal flow between radar transmitters and radar receivers, the radar transmitters and receivers being pulsed, continuous wave, or a combination thereof.

FIG. 1 is an illustration of a first radar 10 including a transmitter 12 and a transmit antenna 14 as well as a receiver 20 and a receive antenna 22. In the illustrated embodiment, transmitter 12 is configured as a pulsed radar transmitter and receiver 20 is configured as a continuous wave receiver. FIG. 1 also illustrates a second radar 40 which includes a transmitter 42, a receiver 44, a transmit/receive switch 46, and a transmit/receive antenna 48. In the illustrated embodiment, transmitter 42 is configured as a continuous wave transmitter and receiver 44 is configured as a pulsed radar receiver.

As shown in FIG. 1, pulsed radar transmitter 12 accepts data from a computer controller 50, performs forward error correction on and interleaving of the data received from computer controller 50, and transmits pulses through transmit antenna 14 using baseline differential pulse position modulation (BDPPM), as described below, to encode data onto transmitted radar pulses.

Pulsed radar receiver 44 demodulates the BDPPM modulated pulses received via transmit/receive antenna 48, decodes the forward error correction and de-interleaves the data encoded onto the radar pulse, and sends the data to computer controller 60 processing.

Continuous wave transmitter 42 accepts data from computer controller 60, performs forward error correction all on and interleaving of the data received from computer controller 60 and modulates a continuous wave signal, for example, using direct sequence phase shift keying for transmission through transmit/receive switch 46 and transmit/receive antenna 48.

Continuous wave receiver 20 de-modulates the signal received via receive antenna 22, for example, using direct sequence phase shift keying. Continuous wave receiver 20 then decodes the forward error correction and de-interleaves the data that was encoded onto the transmitted signal before the signal was received at receive antenna 22. The de-interleaved data is then sent to computer controller 50 for processing.

Figure 2:
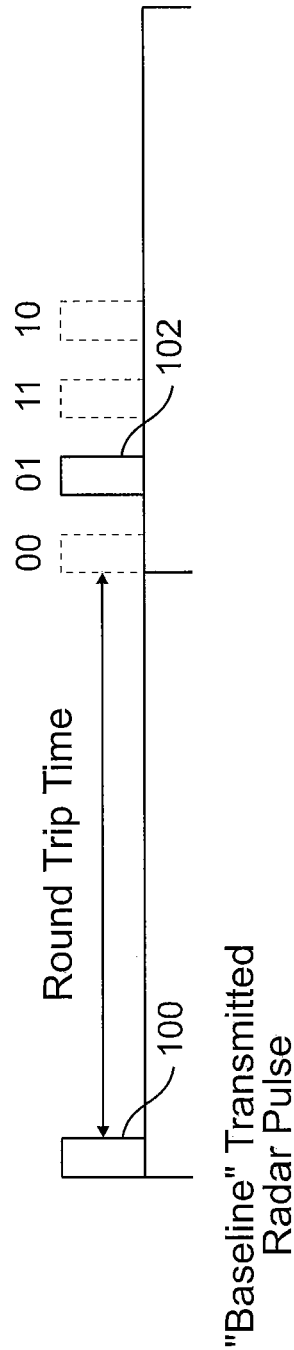
FIG. 2 is an illustration of a baseline differential pulse position modulation (BDPPM) scheme.

FIG. 2 is an illustration of baseline differential pulse position modulation (BDPPM). A transmitted pulse 100 is used as a "baseline" reference for one of M potential positions or slots in which the next transmitted radar pulse could occur. In the illustrated example, the number of potential slots for the next transmitted radar pulse is four, or M=4. The slot in which the next transmitted radar pulse occurs depends on the data sequence modulating the transmitted data pulse. Again referring to the illustrated example, the data sequence "01" results in the next transmitted radar pulse being delayed by one additional slot time. If the data sequence "10" were to be modulated onto the transmitted radar pulse, the next transmitted radar pulse would be delayed by three additional slot times. Whatever slot time the next radar pulse occurs, for example, radar pulse 102, this pulse becomes the next "baseline" from which the differential pulse position is calculated for the next transmitted pulse.

In order not to interfere with a normal radar function, for example, a radar altimeter function, the round-trip time associated with the maximum range of the radar determines the maximum number of slot times. The maximum number of slot times (M) is sometimes referred to herein as the M-ary value of the pulse position modulation scheme. In this modulation scheme, $\log_2 M$ bits are represented by each pulse (e.g. M=4). For shorter radar ranges (smaller round-trip travel times), smaller M are utilized so that the sensing update rate to the user is not delayed to an intolerable degree. Longer radar ranges allow for more slot times (e.g, larger values for M), but may delay the sensing update rate to a degree intolerable by the user. A Doppler calculation performed by each respective radar, and associated with the maximum relative velocity between the transmitter and receiver determines the time space between potential received pulse slots.

Figure 3:
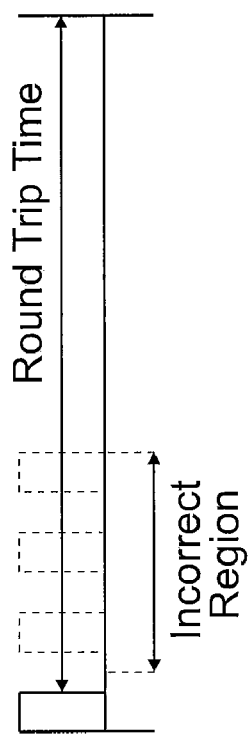
FIG. 3 is an illustration of an incorrect region with respect to a radar transmission that can occur when pulses from neighboring pulsed transmitters are received along with the intended pulse.

As shown in FIG. 3, the probability of, and duration of, receiving interfering pulses from other radar transmitters in the vicinity arriving during in one of the incorrect to slot times (e.g., within an incorrect region) could possibly cause an incorrect pulse to be utilized as the next baseline pulse. Therefore, prevention of such occurrence is considered when determining a configuration for forward error correction as well as determining a configuration for the interleaving function.

A probability that one or more pulses from transmitters in the vicinity might be received by the radar receiver in the incorrect region can be calculated by assuming a uniform distribution, knowledge of, or an estimate of the number of transmitters in the vicinity. Any code used for forward error correction is selected to correct for the probability of one or more pulses from transmitters in the vicinity arriving in the incorrect region. The code treats the reception of multiple pulses as an erasure and utilizes an inner code, for example, such as a Reed-Solomon decoder to correct for the undesired pulse occurrences.

A depth for the interleaving function must be configured to withstand the maximum duration of a multiple pulse event such that bit errors can be corrected by an outer code such as a Viterbi decoder. A duration of the maximum pulse event can be calculated based on the number of local transmitters and their velocities relative to the receiver. In alternative embodiments, one or both of the degree of forward error correction and a depth for the interleaving function are adaptable. The forward error correction and interleaving function are increased or decreased as necessary to accommodate a current local density of radar transmitters.

In a specific embodiment, in order to join a network of radar transmitters and receivers incorporating pulse position modulation, a transmitting device utilizes one of a small number of common code patterns which all receiving devices within the network monitor. To increase the overall probability that a new user (e.g., a radar transmitter incorporating pulse position modulation) will be able to join the network, in one embodiment, the radar transmitters and receivers within the network implement one of a random back-off to prevent code collision, a switch to a different networking join code pattern, or a frequency change.

Figure 4:
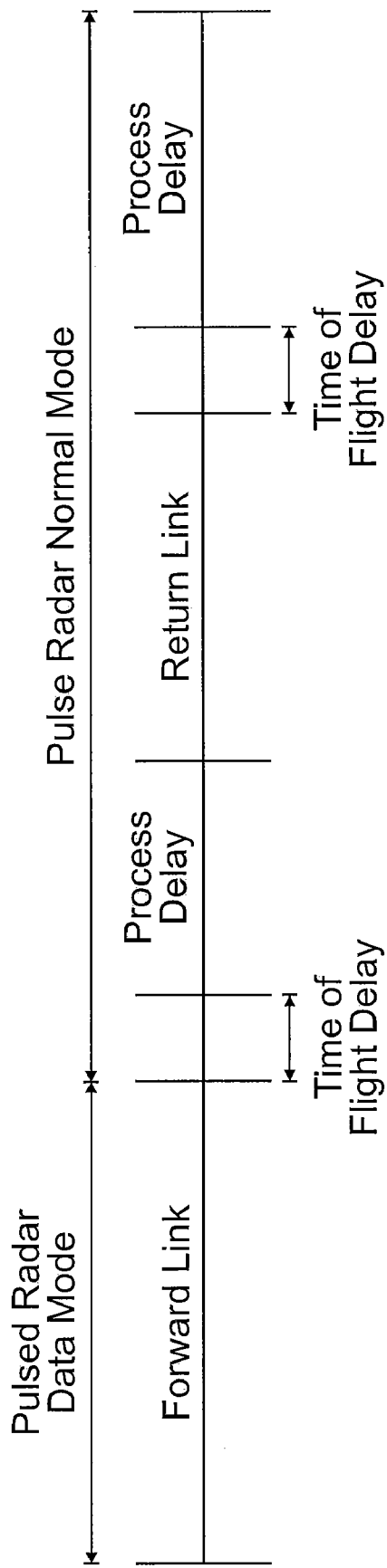
FIG. 4 is a diagram of a frame structure used for data communication between a pulsed radar and a continuous wave (CW) device.

Certain embodiments of a pulsed radar are capable of transmitting pulses and receiving continuous wave transmissions simultaneously if the continuous wave signal has the proper forward error correction and interleaving to operate through continuous wave signal dropouts that occur when the radar is transmitting a pulse. One example of such forward error correction is a direct sequence spread phase shift keyed signal. A direct sequence spread phase shift keyed signal has the proper forward error correction and interleaving to operate through the received signal drop outs that occur when the transmitted pulse occurs. As illustrated in FIG. 4, time multiplexing can be utilized to send data on the transmitted pulses, following by "dead time" to allow for the transmitted signal, followed by a continuous wave transmission.

In one embodiment, a multi-user detection scheme separates the multiple continuous wave signals received by the pulsed radar altimeter without inhibiting the radar sensing function of the radar. Also, forward error correction and interleaving of data bits is utilized to separate the multiple received signals, and accounts for the additional pulses received at the radar transmitter/receiver.

The above described embodiments result in a method for using outgoing transmissions of a pulsed radar for data communications in a manner that is simultaneous, transparent, non-disruptive, and non-interfering to the radar transmission function of the transmitting radar and to the radar sensing function of the receiving radar. The data communications can occur between two pulsed radars even though main beams of the two radars are non-coincident. More specifically, data communications can occur between a transmitting radar in a receiving radar based on side lobe to side lobe communications. The same is true for a pulsed radar and a continuous wave device. Forward error correction and data interleaving added to the transmitted radar signals account for signal dropouts associated with multiple pulsed radar transmitters in the locality.

The above described embodiments may be utilized in a number of applications. In one particular embodiment, an aircraft-based radar altimeter transmission including the data communications are utilized to provide re-targeting data to precision guided munitions (PGMs) that may have been launched from the aircraft. The above described methods and systems provide a new capability for surface attack with PGMs by providing the ability to re-target GPS-guided PGMs in flight to hit moving targets. Streaming current position information provides an impact point of each PGM so that bomb damage assessment (BDA) is done in real-time, which simplifies and shortens any re-targeting cycle.

Figure 5:
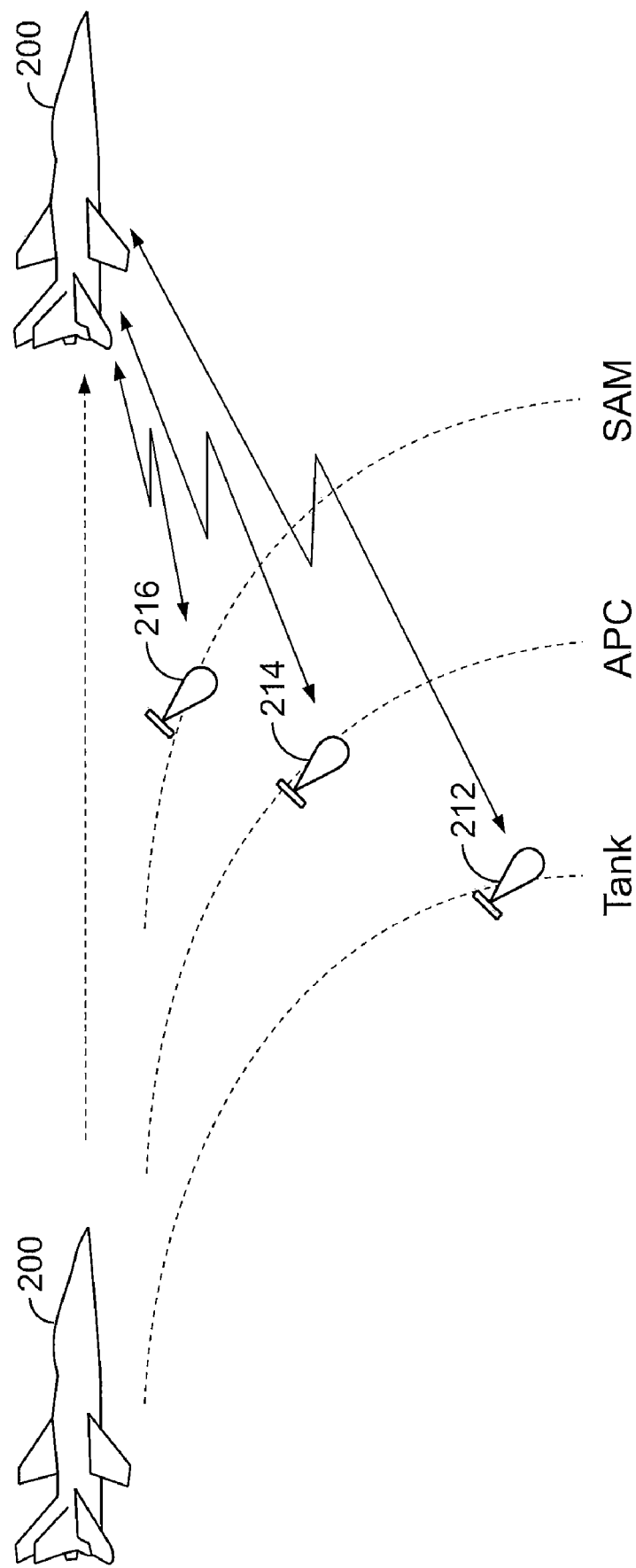
FIG. 5 is an illustration of a launch platform communicating with launched programmable guided munitions using baseline differential pulse position modulation (BDPPM).

FIG. 5 illustrates utilization of radar altimeter waveforms to provide re-targeting data to precision guided munitions (PGMs) using baseline differential pulse position modulation (BDPPM). In one embodiment, a radar altimeter in launch platform 200 is integrated with a targeting computer. The radar altimeter is modified to transmit BDPPM data, primarily target position updates, to PGMs 212, 214, and 216. The radar altimeter within launch platform 200 is further modified to receive BDPPM data from PGMs 212, 214, and 216 which primarily includes a status and/or a location of PGMs 212, 214, and 216. Referring to the descriptions above, the slot in which each respective PGM 212, 214, and 216 receives the transmitted BDPPM pulse from the radar altimeter is interpreted as a command to adjust the PGM's descent. Each different slot corresponds to a different adjustment in descent. Similarly, the PGMs 212, 214, and 216 provide positioning updates to the launch platform (e.g., the radar altimeter) based on which slot a BDPPM radar pulse transmitted by the respective PGM is received by the radar altimeter.

As each PGM 212, 214, and 216 progresses further from platform 200, the transmit power of each PGM is increased. The transmit power is increased as a function of time after release to attempt to provide an approximately constant received power level at the radar altimeter. This results in a substantially balanced received power at the launch platform 200 (e.g., the radar altimeter) from all the released PGMs. In a specific embodiment, a received power difference for all PGMs providing position updates to the platform is less than 3 dB.

While the invention has been described in terms of various specific embodiments, those skilled in the art will recognize that the invention can be practiced with modification within the spirit and scope of the claims.

What is claimed is:

1. A method for transmitting data utilizing transmitted radar pulses, said method comprising:
   determining a pulse repetition interval for radar transmissions;
   providing a first radar pulse for utilization as a reference pulse;
   providing a second radar pulse based on the pulse repetition interval, a position of the second radar pulse with respect to the pulse repetition interval and the first radar pulse indicative of data to be provided to an intended receiver; and
   determining a number of potential time slots in which the second radar pulse can occur based on a range of the radar.

2. A method according to claim 1 wherein providing a second radar pulse based on the pulse repetition interval comprises determining a position of the second radar pulse based on a data sequence utilized in modulating the radar pulses.

3. A method according to claim 1 wherein determining a number of potential time slots in which the second radar pulse can occur based on a range of the radar comprises determining a maximum number of time slots based on a round trip travel time for radar pulses at a maximum range of the radar.

4. A method according to claim 1 further comprising utilizing the second radar pulse as a reference pulse for a future radar pulse transmission.

5. A method according to claim 1 further comprising utilizing forward error correction to operate through drop outs of a received signal during a pulse transmission.

6. A method according to claim 5 wherein utilizing forward error correction comprises utilizing a direct sequence spread phase shift keyed signal for error correction and interleaving of a received signal.

7. A radar altimeter comprising:
   a transmitter; and
   a radar processor configured to receive data from a controller, said radar processor configured to cause said transmitter to transmit radar pulses at a pulse repetition interval where a position of a second radar pulse with respect to the pulse repetition interval and a first radar pulse is determined based on the data received from the controller;
   wherein said radar processor is configured to determine a number of time slots during which a second radar pulse can be transmitted based on a range of said radar altimeter.

8. A radar altimeter according to claim 7 wherein said radar processor is configured to determine a number of potential time slots in which the second radar pulse can occur.

9. A radar altimeter according to claim 8 wherein said radar processor is configured to determine a maximum number of potential time slots in which the second radar pulse can occur based on a round trip travel time for transmitted pulses at a maximum range of said radar altimeter.

10. A radar altimeter according to claim 7 wherein said radar processor is configured to utilize a position of a transmitted second radar pulse as a reference pulse for a future radar pulse transmission.

11. A radar altimeter according to claim 7 further comprising a radar receiver, said radar processor configured to utilize forward error correction to operate through drop outs of a received signal during a pulse transmission.

* * * * *